(12) United States Patent
Luckhardt et al.

(10) Patent No.: US 8,563,059 B2
(45) Date of Patent: Oct. 22, 2013

(54) OVEN AND METHOD OF OPERATING THE SAME

(75) Inventors: Christoph Luckhardt, Schenklengsfeld (DE); Florian Ruther, Steinsfeld (DE)

(73) Assignee: Electrolux Home Products Corporation N.V., Zaventem (BE)

( * ) Notice: Subject to any disclaimer, the term of this patent is extended or adjusted under 35 U.S.C. 154(b) by 216 days.

(21) Appl. No.: 12/999,083

(22) PCT Filed: Jun. 6, 2009

(86) PCT No.: PCT/EP2009/004631
§ 371 (c)(1),
(2), (4) Date: Dec. 15, 2010

(87) PCT Pub. No.: WO2010/012340
PCT Pub. Date: Feb. 4, 2010

(65) Prior Publication Data
US 2011/0123689 A1    May 26, 2011

(30) Foreign Application Priority Data
Jul. 30, 2008   (EP) ...................................... 08013651

(51) Int. Cl.
*A21B 1/40*    (2006.01)
(52) U.S. Cl.
USPC .......................................... 426/233; 426/523
(58) Field of Classification Search
USPC .......................... 426/231–233, 523, 248, 238
See application file for complete search history.

(56) References Cited

U.S. PATENT DOCUMENTS

| | | | | |
|---|---|---|---|---|
| 4,628,351 A * | 12/1986 | Heo | ............................... | 348/156 |
| 4,831,239 A * | 5/1989 | Ueda | .............................. | 219/518 |
| 4,868,357 A * | 9/1989 | Serikawa et al. | .............. | 219/706 |
| 5,361,681 A * | 11/1994 | Hedstrom et al. | .............. | 99/331 |
| 5,369,252 A * | 11/1994 | Kondo | ............................ | 219/704 |
| 5,893,051 A | 4/1999 | Tomohiro | | |
| 6,299,920 B1 * | 10/2001 | Saksena | ........................ | 426/231 |
| 6,559,882 B1 * | 5/2003 | Kerchner | ........................ | 348/61 |
| 7,156,730 B1 | 1/2007 | Blaine | | |
| 7,933,733 B2 * | 4/2011 | Ashrafzadeh et al. | ......... | 702/116 |
| 7,969,454 B2 * | 6/2011 | Isomura | ........................ | 345/641 |
| 8,371,285 B2 * | 2/2013 | Wiker et al. | ................. | 126/21 A |
| 2007/0246453 A1 | 10/2007 | Nam | | |
| 2007/0254080 A1* | 11/2007 | Schackmuth et al. | ......... | 426/523 |
| 2009/0017173 A1* | 1/2009 | Kozman et al. | ............... | 426/233 |
| 2011/0253693 A1* | 10/2011 | Lyons et al. | ................... | 219/209 |

FOREIGN PATENT DOCUMENTS

| | | |
|---|---|---|
| DE | 10063694 | 7/2002 |
| EP | 0264935 | 4/1988 |
| EP | 0271899 | 6/1988 |
| EP | 0563698 | 10/1993 |

(Continued)

OTHER PUBLICATIONS

International Search Report for PCT/EP2009/004631 dated Oct. 2, 2009, 3 pages.

*Primary Examiner* — Drew E Becker
(74) *Attorney, Agent, or Firm* — Pearne & Gordon LLP

(57) ABSTRACT

The invention in particular relates to an oven (1) for baking food products (3). In order to improve automated heating procedures, the oven (1) comprises a camera (7) and a distance sensor (8), for example, which are used in concert to enable precise extraction of product-features that are relevant and used with automated heating procedures.

12 Claims, 8 Drawing Sheets

(56) References Cited

FOREIGN PATENT DOCUMENTS

| | | |
|---|---|---|
| EP | 1033538 | 9/2000 |
| EP | 1850642 | 10/2007 |
| EP | 1921384 | 5/2008 |
| JP | 02122119 | 5/1990 |
| WO | 03011090 | 2/2003 |

* cited by examiner

OVEN AND METHOD OF OPERATING THE SAME

The present invention relates to an oven and to a method of operating the same.

BACKGROUND OF THE INVENTION

Operating state of the art baking ovens usually requires a user to select temperature and duration, and more or less continuously to observe the time course of a baking process.

In order to ease the operation of ovens, methods have been developed for more or less automating baking processes. Such methods for example provide automatic temperature control based on surface or core temperature values measured by temperature sensors during the baking process. Other known methods numerically approximate actual temperatures during the baking process, based on the applied temperature and the heat equation, for example.

In the field of baking ovens, and more particularly in the field of microwave ovens, it is known to use ultrasonic or infrared distance sensors, or photo sensors to determine a position, shape or status of the product, e. g. frozen, chilled or thawn. Position, shape and status are used for controlling the process of heating the product.

Other methods use cameras for taking pictures of the product and for approximating the shape, volume or size of the product in order to improve automation of the heating process.

The known methods and related ovens are far from providing possibilities of fully automated heating, and often require user interaction. In the technical field of ovens, it is therefore desirable to provide enhanced and user friendly possibilities for automated operation of ovens.

SUMMARY OF THE INVENTION

Therefore, it is an object of the invention to provide an oven suitable for more accurately conducting a heating process in an automated manner. It is a further object to provide a method of more accurately operating an oven in an automated manner.

This object is achieved by an oven and a method of operating the same according to claims 1 and 8, respectively. Advantageous embodiments result from dependent claims 2 to 7 and 9 to 14.

According to a first aspect of the present invention, an oven for heating food products, comprising a chamber adapted to receive the product via a chamber opening is provided. The oven can be of any type suitable for heating products, particularly food products. Heating of the products can comprise baking, broiling, browning, roasting or thawing and the like. The oven preferably is a baking oven, but can be of any other type, for example a microwave oven.

The oven according to the invention comprises a product-feature extracting system designed for extracting at least one product-feature representative of a configuration of the product. Without making a claim to be exhaustive, possible product-features are: vertical cross section, horizontal cross section, shape, particularly 3d-model, surface, surface area, volume, dimensions, particularly length, width, height of the product, center-of-gravity of the product and center-of-gravity to surface distance The product-feature extracting system comprises at least one camera, e. g. a digital camera, designed and positioned for recording product top-views. A product top-view shall mean any view of the product, e. g. a two-dimensional picture of the product, showing at least a part of the upper side of the product. Here, the upper side of the product shall mean a side of the product facing upwards in a position occupied in the course of being heated within the chamber.

The term "product top-view" shall not preclude sections or elements of an object inserted along with the product into the chamber being part of the view. Such an object can be a tray, for example, carrying the product. Other objects are conceivable, for example temperature sensors attached to or put into the product. In order to ease differentiation between product and object within a view, special marks, colors or color codes can be provided with the object for example.

The product-feature extracting system further comprises at least one contour-level unit designed and positioned for extracting or highlighting contour-levels of at least a section of the product and, as the case may be, an object intended for insertion along with the product into the chamber.

Further, the product-feature extracting system comprises a product-feature extracting unit for extracting the at least one product-feature on the basis of the top-views and contour-levels.

It shall be mentioned, that the invention is not restricted to one single product and one single object. Of course, the invention also applies to more than one product and more than one object, respectively.

The provision and utilization of product top-views and contour-levels makes it possible to extract the product feature or product features more accurately. More accurate product features, such as shape, volume and the like, are the basis for conducting automated heating processes more accurately. In particular, automated heating processes can be conducted with minimal or even without any user interaction.

A mounting position of at least one of the at least one camera and the at least one contour-level unit preferably is such that high quality and accurate views and contour-levels can be obtained for a wide range of product types, product shapes and product locations within the chamber. Preferred mounting positions are: upper part of the opening, preferably at the entrance site, above a door for closing and releasing the opening, upper part of the chamber, preferably halfway the depth of the chamber. Mounting positions outside the chamber, e. g. at the entrance site, or above the door have the advantage of greatly avoiding disturbing and harmful influences arising from high temperatures and temperature variations, dirt that could probably stain the camera lens, humidity and infrared radiation reflected by the product, object or chamber walls.

Particularly mounting positions outside the chamber, open the possibility to obtain the product top-views and contour-levels in the course of inserting the product and object into the chamber. A mounting position at an upper part of the chamber, about halfway the depth of the chamber, opens the possibility of acquiring additional product top-views and contour-levels in the course of heating the product. Such additional product top-views and contour-levels may be used to further optimize automated heating of the product. For example, the respective status of browning, or shape variations of the product can be extracted and monitored during heating. Such and other parameters are often indicative of the stage of the heating process.

The contour-level unit can comprise at least one of a distance sensor designed for measuring distances between the sensor and upper surface levels of the product and the object, respectively, and a light emitting device, preferably a laser, more preferably a line laser, positioned and designed for highlighting a contour of the product and object, respectively, by respectively projecting a beam of light, preferably a laser line, preferably at a predefined angle, onto the product and object. The beam of light may comprise at least one of at least one ray, at least one fan-shaped beam of light and at least one cone-shaped beam of light. Thereby it is possible to highlight single point contour-levels, one or several contour-level slices or one or several contour-level spots. Note, that aperture angles of the beam of light, as far as relevant, may be used for calculating contours of height levels of the product and object, respectively.

Comparatively robust and reliable distance sensors, such as infrared or ultrasonic distance sensors can be used for measuring the distances between the product and the sensor. The distances can be measured in the course of inserting the product into the oven. Such distances are representative of contour-levels of the product and can be correlated with the top-view or with several top-views to calculate a product-feature, as for example a cross-sectional contour, the volume, a shape of the product or height levels of the product.

As mentioned above, not only distance sensors, but also light emitting devices or even distance sensors together with light emitting devices can be used in concert with one or more cameras to extract product features. The light emitting device, laser and line laser, respectively, can be used to project a beam of light or laser line onto the product and object, respectively, thereby highlighting contour-levels of at least a section of the product or object. By using light emitting devices emitting a green or red beam of light, for example, the highlighted contour-levels or even a section of the product contour can be extracted from the product top-view using image processing methods, for example.

Highlighted contour levels can be identified within the product top-views on the basis of special or characteristic colors or gray scales of the beam of light or laser line, respectively. Similarly, contour-levels obtained by using a light emitting device and product top-views can be combined to calculate at least one product-feature. A plurality of product top-views containing highlighted contour-levels can be recorded in the course of inserting the product into the chamber, which product views can be combined to accurately calculate the required product-feature. It shall be mentioned, that triangulation can be used to calculate contour-levels, if for example the starting point and irradiation angle of the beam of light, or laser line, respectively, is known. However, other methods can be used as well.

Automated heating of the product can conducted more accurately, if an initial temperature of the product, i. e. a temperature of the product prior to heating, is known. The initial temperature may for example be used to select a predefined heating protocol from a list of given heating protocols.

The initial temperature and the product-feature "surface area", for example, can be used for estimating, calculating or predicting energy consumption of the product during heating.

Further, the initial temperature or temperature distribution can be used to classify the product as frozen, chilled or non-frozen, for example.

Therefore it is of advantage, if the oven further comprises at least one temperature sensor adapted to measure at least one of an initial temperature and initial temperature distribution of the product. The term "initial temperature" shall mean the temperature prior to heating. Such a temperature sensor may be of infrared type. Note, that automatic heating can be further refined by using temperature values measured during heating.

In order to reduce impacts arising from heating the product, particularly in the case of baking ovens reaching chamber temperatures of 200° C. and more, it can be of advantage, if the temperature sensor is mounted outside the chamber.

However, robust temperature sensors can be used and mounted within the chamber or a wall thereof. Such positions make it possible to trace the product temperature during heating, which can be used to optimize automated heating, as already mentioned above.

Particularly in connection with baking ovens, it has turned out, that sensors mounted outside the chamber at an upper site or above the opening make it possible to measure the initial temperature or other parameters in nearly any circumstances and for nearly any product types. This is due to the fact, that the top side of a product rarely is hidden or covered during insertion and therefore is nearly always accessible to respective measurements. However, any other suitable mounting positions are possible.

Depending on the position of the temperature sensor, the initial temperature or temperature distribution can be measured at least one of prior to, in the course of and after insertion of the product into the chamber. It is of advantage, if the time point of initial temperature measurement is close to a starting point of the heating procedure.

A further important parameter in connection with automated heating is the product weight. Therefore it is of advantage if the oven further comprises at least one weight sensor for at least one of measuring and determining the weight of the product and object, respectively.

If the weight of the object, for example a tray, is known, the net weight of the product can be calculated. The weight can be used to calculate the density of the product if the product-feature "volume" of the product is known or calculated beforehand.

The weight sensor also can be used to determine a time course development of the product weight during heating. The time course of the product weight can be used for further refining automated heating.

It shall be mentioned, that it is also possible that the oven has a function of inputting the weight by a user.

The oven according to invention makes it possible to implement reliable and precise methods of operating the oven in an automated manner. A method of operating the oven is provided in a second aspect of the invention.

The method comprises the following steps:
a) extracting a product-feature of the product intended to be heated in the chamber, by
  recording at least one product top-view via the at least one camera;
  at least one of extracting or highlighting contour-levels of at least a section of the product and, as the case may be, an object intended for insertion along with the product into the chamber, by using at least one contour-level unit; and
  extracting the at least one product-feature on the basis of the top-views and contour-levels and
b) based on at least one product-feature, and optional secondary data representative of a physical configuration of the product, preferably at least one of product temperature, product weight and product density, automatically controlling or conducting heating of the product.

Reference is made to the explanations in connection with the first aspect of the invention. Hence the method according to the second aspect provides the possibility of conducting automated heating of the product in a particularly precise, accurate and reliable manner.

Product top-views, contour-lines, product-features, secondary data and the like can be obtained as mentioned further above. Hence reference is made to respective explanations in connection with the first aspect of the invention.

For extracting certain product-features it may be of advantage, if at least a section of the product is registered within a two-dimensional product top-view, preferably recorded at a time the product is completely in a field of view of the camera. Such registration may be useful to identify the product in the respective view. Registration results may be used to calculate edges, borders or circumferential lines of the product. Additional data retrieved from registration, i. e. registered product data such as a length or diameter of the product, can be used for calculating a certain product feature.

In the case that contour-levels of only a portion of the product and object, respectively, are available, additional contour-levels can be approximated on the basis of available contour-levels. The additional contour-levels facilitate product-feature extraction.

The situation of a limited number of contour-levels may arise from limited field of views and detection ranges, which, by the way, may be intentional. Further, unfavourable product positions also may lead to a limited number of contour-levels.

Similarly, if only a section of the product can be registered in the product top-views, reconstruction of the whole product can be based on at least one of presumptions related to product shape, as for example symmetry, contour-levels and further approximated contour levels. In addition, registration data of only a section of the product can be compared to product shapes or forms that are typical to respective ovens and related methods. Here, a database of typical product shapes can be used.

In many instances, the object is a tray or plate on which the product is placed and rests during heating. Contours, particularly cross-sectional contours of the product, can be extracted more easily, if a tray-level or plate-level, i. e. a height level the tray or plate occupies within the chamber is determined automatically. This can be done on the basis of tray or plate contour-levels, i. e. contour-levels identified to belong to the tray or plate as such. This also applies to situations, in which several objects are inserted in concert with the product. For example, the product can be positioned on or in a plate, cup or baking tin which in turn can be placed on a tray. A priori knowledge of the respective object or objects, such as weight, height, height-level and the like can be used for product-feature extraction. It shall be mentioned, that the tray-level usually is limited to a given number of possible tray-levels.

BRIEF DESCRIPTION OF THE DRAWINGS

The invention will be described in further detail with reference to the drawings, in which.

DETAILED DESCRIPTION OF THE INVENTION

It shall be noted, that like reference numbers denote like elements, or elements that are similar or similar in function.

The Figures are schematic and not necessarily true to scale. The invention will be described in connection with a baking oven, which shall not be construed as limiting the scope of invention. The function of the baking oven is described only in so far as is necessary for understanding the invention.

Figure 1:
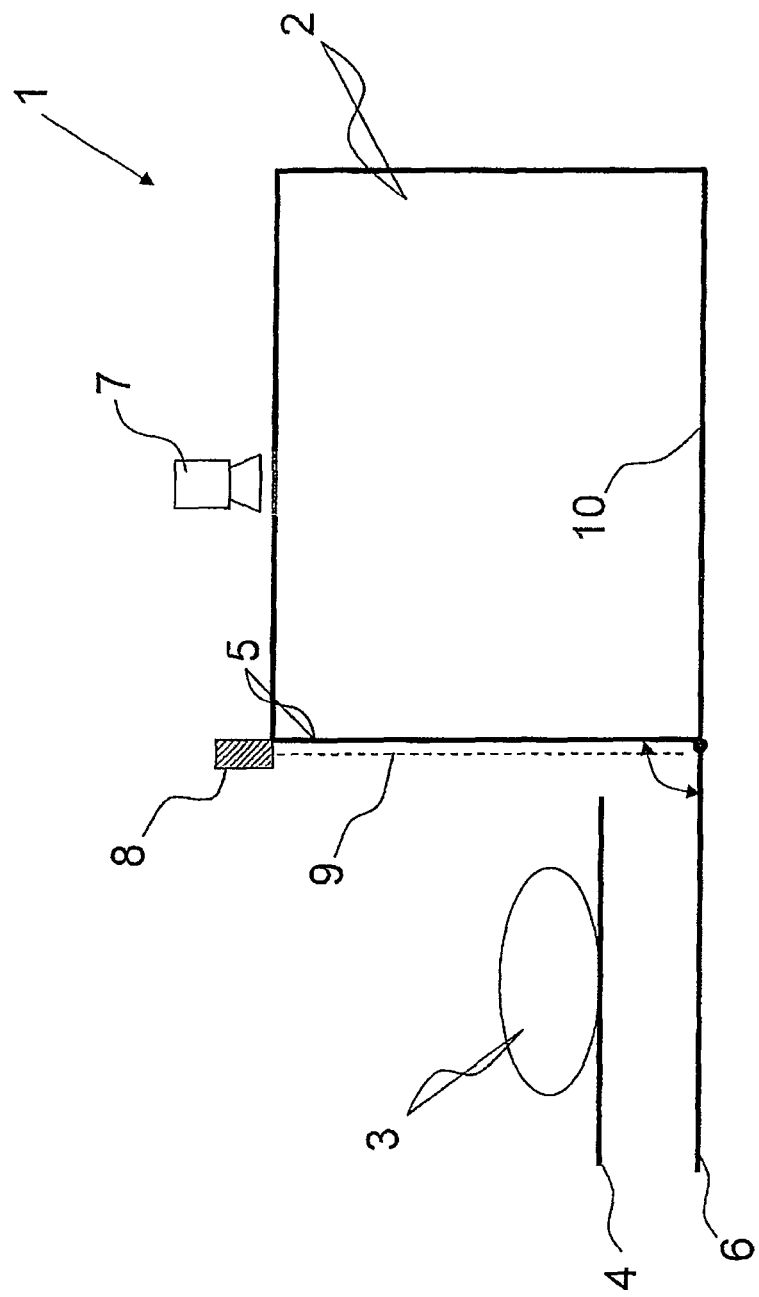
FIG. 1 illustrates a schematic sectional side view of a baking oven in a first embodiment.

FIG. 1 illustrates a sectional side view of a baking oven 1 in a first embodiment. The baking oven 1 comprises a baking chamber 2. The chamber 2 is adapted to receive a baking product 3 positioned on a tray 4 via a chamber opening 5. The baking oven 1 further comprises a door 6 adapted for closing and releasing the opening 5, which is indicated by a double arrow. FIG. 1 shows the situation prior to insertion of the food product 3.

The baking oven further comprises a digital camera 7 and a distance sensor 8 of infrared or ultrasound type. Infrared waves or ultrasound waves used for distance measurement are indicated by a broken line and designated by reference number 9.

In the present case, the distance sensor 8 is mounted at an entrance site of the chamber opening 5, above the door 6 in a closed position thereof. In such a position the distance sensor 8 can be shielded from heat, humidity and dust generated in the course of baking the baking product 3. Consequently, the distance sensor 8 is not exposed to influences that may disrupt distance measurements.

The digital camera 7 is mounted in an upper part of the chamber opening 5 about halfway the depth of the baking chamber 2. Such a position has the advantage, that product top-views can be recorded for a wide variety of baking product positions within the baking chamber 2. Further, product top-views can be recorded in the course of baking.

Figure 2:
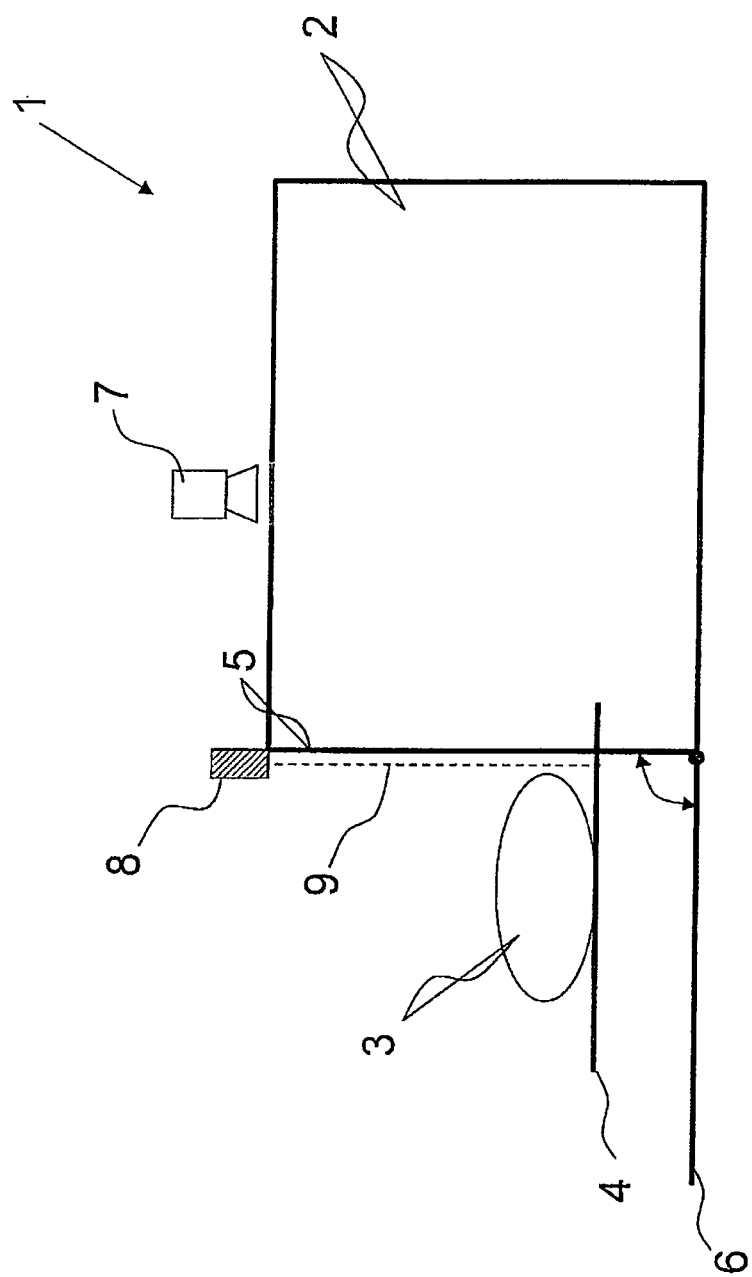
FIGS. 2 to 4 illustrate schematic sectional side views at different time points in the course of inserting a tray along with a food product into a baking chamber of the baking oven.
Figure 3:
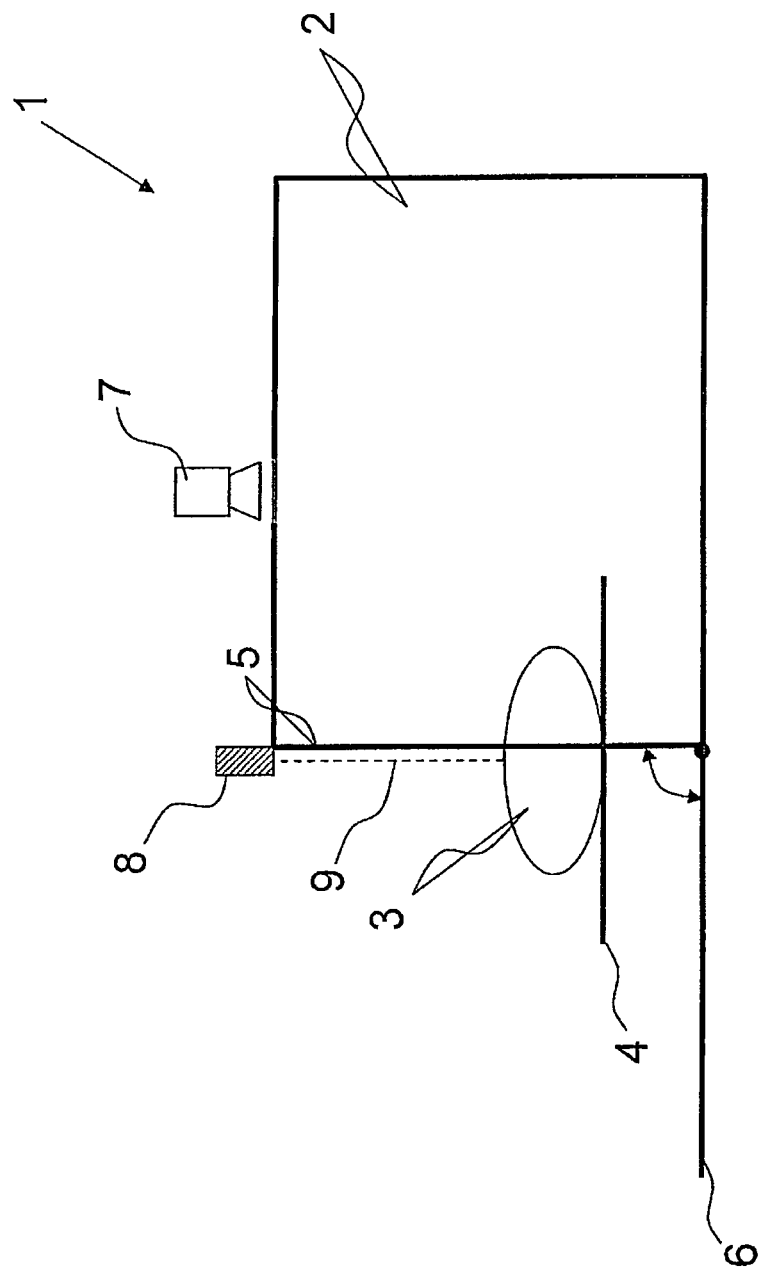
Figure 4:
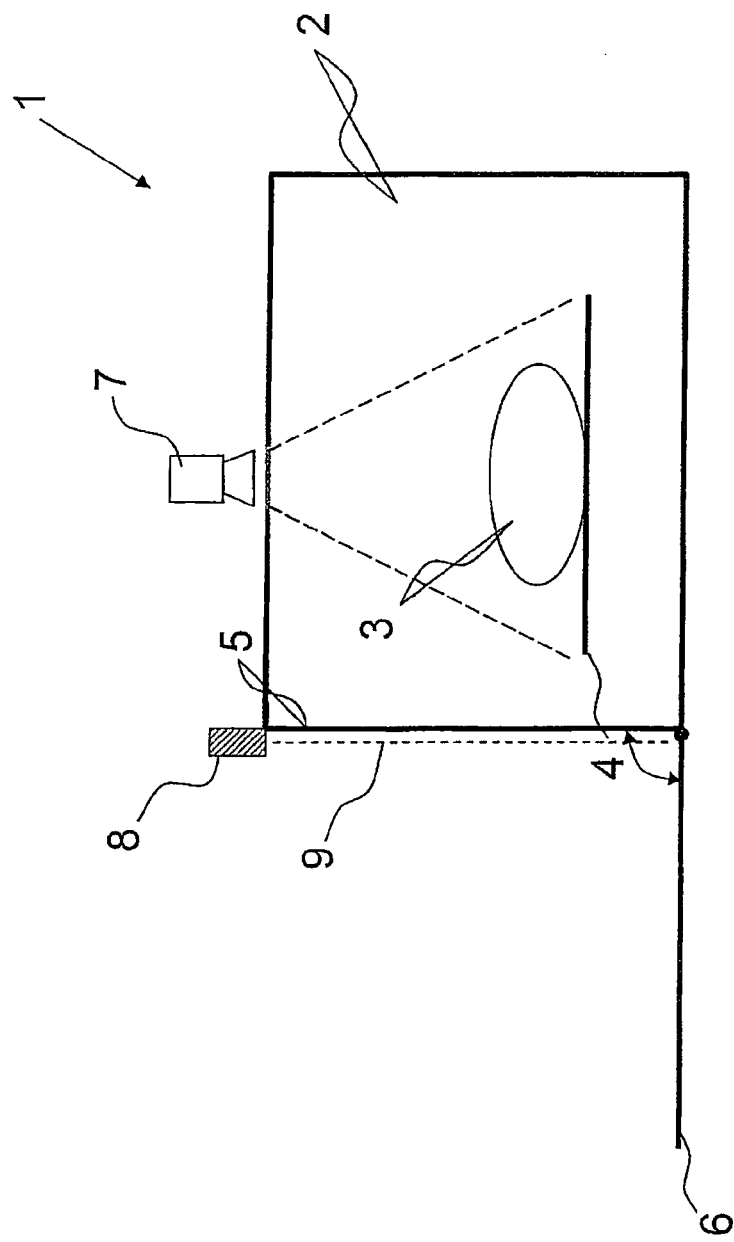

An operational mode of the baking oven 1 will be described in connection with FIGS. 2 to 4 illustrating sectional side views of the baking oven 1 at different points in time in the course of inserting the tray 4 along with the baking product 3 into the baking chamber 2.

The distance sensor 8 can be activated to start distance measurements via signals representative of a state of the door 6, for example. Such signals may indicate, for example, that the door 6 is open or in the closed state, and can be used to activate and deactivate the distance sensor 8, respectively. Other signals, such as signals of motion and contact sensors scanning the entrance site of the baking chamber 2 for objects to be inserted into the baking chamber 2, can also be used. If such a sensor detects an object to be inserted, the distance sensor 8 can be activated to start distance measurements.

In the present case, the distance sensor 8 is activated upon opening the door 6, which has already occurred with the situation in FIG. 1. After activation, the distance sensor 8 continuously measures distances in the course of insertion of the food product 3 and tray 4 into the baking chamber 2. The distances are representative of distances between the distance sensor 8 and a bottom 10 of the baking chamber 2, between the distance sensor 8 and the tray 4 or between the distance sensor 8 and the baking product 3.

In FIG. 2, a part of the tray 4, but not the baking product 3, has already passed the distance sensor 8. Distances measured up to this stage are representative of a tray-level, i. e. a height level of the tray 4 relative to the bottom 10 of the baking chamber 2. A priori information about possible tray-levels may be used for tray-level determination, if for example height levels of tray guides of the side walls of the baking chamber 2 are known.

Upon further insertion of the tray 4 also the baking product 3 will pass the distance sensor 8. Distances measured in this stage, are representative of local height levels of the baking product 3. In FIG. 3, about half of the baking product has passed the distance sensor 8.

In FIG. 4, the tray 4 and baking product 3 are completely inserted into the baking chamber 2, and the baking product 3 is in its final position, ready for baking. In this stage, a product top-view is recorded by the digital camera 7, which is indicated by broken lines.

Figure 5:
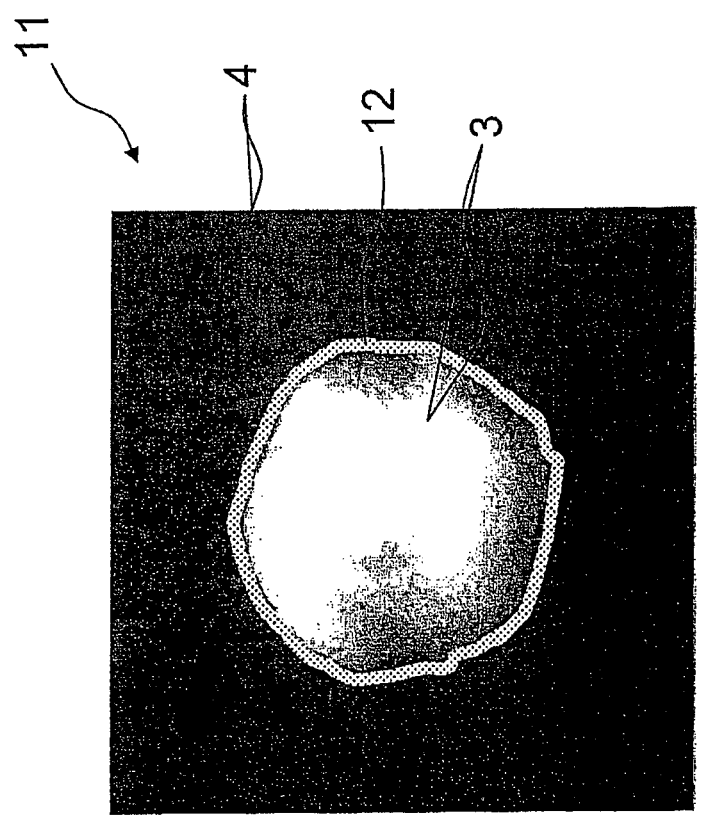
FIG. 5 illustrates a product top-view.

FIG. 5 illustrates an exemplary product top-view 11. The product top-view 11 in the present case is a 2-dimensional picture showing the baking product 3 and portions of the tray 3 which, related to an upper point of view, are not hidden by the baking product 3. The contents of the product top-view 11 may vary from case to case and are dependent on the field of view of the camera 7. The field of view, and hence the content of information of the product top-view 11, may be adapted to respective requirements.

The camera 7 may be of color or monochrome type. The product top-view 11 is analysed using conventional image processing methods, to register the baking product 3. Depending on the type of camera 7, either colors or grey scales can be used for registration of the baking product 3. As a result of registration a border 12 between the baking product 3 and the tray 4 can be obtained. The border 12 can be converted into coordinates, for example Cartesian x-y-coordinates.

Figure 6:
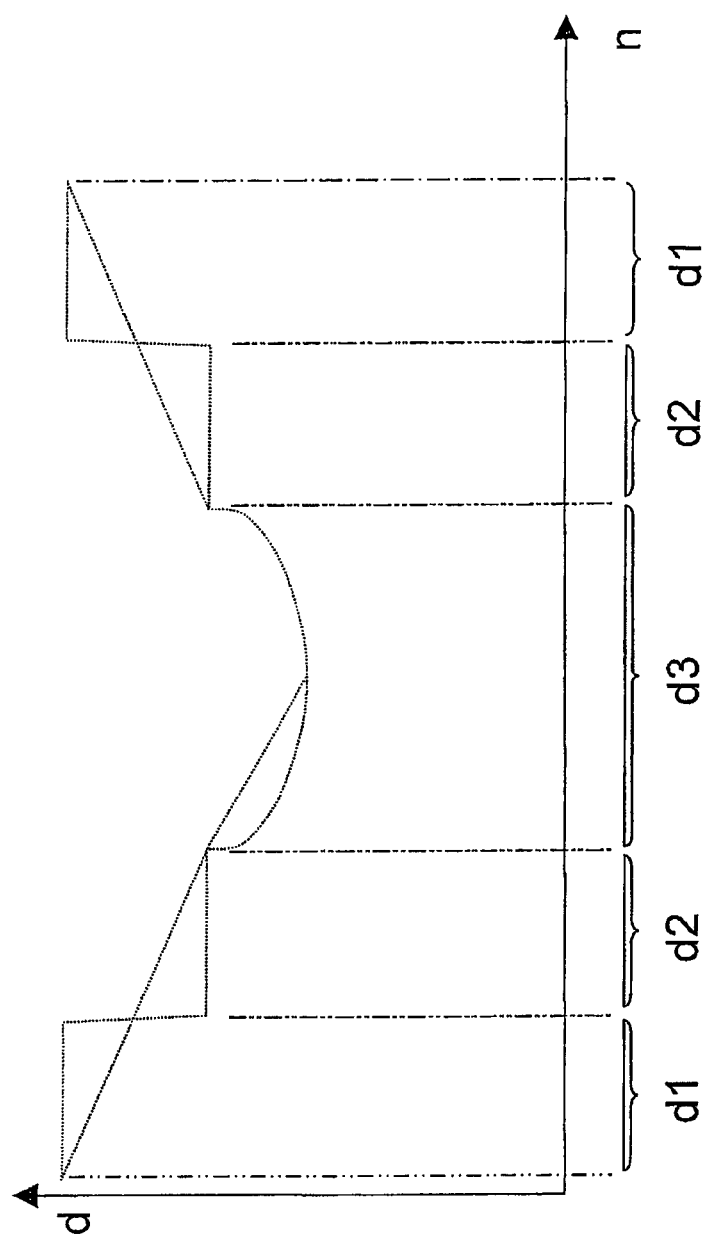
FIG. 6 illustrates a diagram of distances measured by a distance sensor.

FIG. 6 illustrates a diagram of distances d measured by the distance sensor 8 in the course of tray insertion. The distances d are given in arbitrary units (axis of ordinates) according to their chronological succession (abscissa), denoted by reference sign n.

As can be seen from FIG. 6, the distances d can be classified in first distances d1 between the distance sensor 8 and the bottom 10 of the baking chamber 2, second distances d2 between the distance sensor 8 and the tray 4 and third distances d3 between the distance sensor 8 and the baking product 3.

In particular, the distances d are representative of contour-levels of the baking product 3 and tray 4. A contour-level unit (not shown), as for example a microelectronic component, can be used to extract contour-levels from the distances d. For example, contour-levels representing a height profile of a cross-sectional contour of the baking product 3 can be extracted by subtracting distance d2 representing the tray-level from each distance d3. The tray-level can be extracted by using the product top-view and registration data, e. g. the border, to identify sections of the tray 4 not hidden by the baking product 3. The distances d, i. e. the second distances d2 can then be assigned to the respective section. Alternatively, discontinuous rising or falling edges in the succession of distances d, e. g. from bottom-level to tray-level or from tray-level to bottom-level, can be used to identify the tray-level. All this can be done in an automatic manner without the need for user interaction.

A product-feature extracting unit (not shown), integral part of the microelectronic component for example, can be used to combine the baking product contour-levels with x-y-coordinates of the border 12 and to calculate vectors suitable for extracting at least one of the surface and volume of the baking product 3. If required, further or other product-features than the ones mentioned beforehand can be extracted.

In the present case, only contour-levels corresponding to a single cross section of the baking product 3 are extracted. In order to calculate the surface and volume from the contour-levels it is presumed that baking product 3 is of symmetric shape. In order to extract the product-features more accurately, it is possible to compare the baking-product 3 to a database of conventional product shapes, based on the product top-view and available contour-levels. Alternatively, it is possible to provide a user interface for inputting product shape information suitable for extracting the product-feature in more detail. Further, it is possible to use several distance sensors 8 in order to extract contour-levels corresponding to different cross sectional contours or slices of the baking product. Likewise, several cameras can be used. By using more than one distance sensor 8 and camera 7, respectively, it is possible to handle non-symmetric product shapes and even cases, in which several baking products 3 are positioned on the tray 4.

It shall be mentioned, that additional contour-levels can be approximated from contour-levels extracted as mentioned above, for example by interpolation or extrapolation.

Based on the extracted product-features, it is possible to control baking of the baking product 4 in an automatic manner. Surface and volume are decisive for heat consumption during baking. Hence, using at least the aforementioned product-features gives rise to precise and enhanced automated baking processes.

Generally, a baking protocol selectable from a predefined list of common baking routines can serve as a basis for the automated baking process. Such a baking protocol may be selected on the basis of a product-feature or other configuration of the baking product 3.

For further enhancing automated baking, it is possible to make use of secondary data representative of a physical configuration of the baking product 3. Secondary data such as product temperature, particularly initial product temperature, product weight and product density can be used. For determining the product temperature and product weight, further sensors such as temperature sensors and weight sensors, respectively, can be used. A temperature sensor may for example be used to determine the baking-product configuration such as frozen, chilled, fresh or thawn and the like.

It shall be mentioned, that it is also possible to arrange the distance sensor 8 remote from the entrance site of the baking chamber 2. The temperature senor 8 can be arranged in the vicinity or besides the camera 7. In this case, distances d of only a section of the baking product 3 can be measured. If for example distances d of only one half of the baking product 3 can be measured, product-features can be extracted on the assumption of symmetrical height of the baking product 3. Note that there is the possibility to refine such general presumptions using information retrieved from product top-views.

However, with the aforementioned situation, i. e. positioning the distance sensor 8 besides the camera 7, it is more involved to correlate measured distances d with the baking product 3.

This may be due to the fact that distance measurement may continue while the tray 4 and baking product 3 have reached their final position within the baking chamber 2. Therefore it is required to obtain the distance d measured at the end-point of insertion.

In order to obtain the distance d at the end-point, a sensor for generating a signal representative of an end-point of insertion could be used. This signal can be used either to stop distance measurements or to label the distance d measured at the end-point.

Alternatively, the distance d at the end-point can be determined numerically.

Presumed, the speed of insertion is more or less constant, which for most cases indeed applies, the distance d at the end-point can be calculated, at least in good approximation, as follows:

Distance values belonging to the section of the tray 4, which is close to the back wall of the baking chamber 2, not covered by the baking product 3 and which section has passed the distance sensor 8 in the course of insertion can be determined. This can be done by using the result of automatic tray-level recognition and registration of the food product 3, in that distances d along linear tray section path between an initial tray-level distance and the border 12 of the baking product 3 are determined and assigned to the mentioned section of the tray 4. The mentioned section of the tray 4 can also be identified in a digital product top-view by registration methods, for example.

After identifying this section or tray section path and related distances, the number of pixels of the section along the tray section path can be determined. Note that the path along which distance measurements are conducted can be determined by using a-priori information about the relative distance between camera 7 and distance sensor 8 and their respective product specifications, as for example field of view of the camera 7 and position of a sensor head of the distance sensor 8.

Knowing the number of pixels and distances d corresponding to the tray section path, the ratio: number of distances per pixel can be calculated for the tray section path. As the insertion speed is assumed to be constant, the calculated ratio shall also apply to the baking product 3 and related distances.

After extracting the number of baking product pixels belonging to a baking product path immediately succeeding the tray section path, which can be done by using the registered border 12 and the pixel position of the distance sensor 8 or distance sensor head, the effective number of distances d belonging to the baking product path can be calculated and redundant distances can be discarded, leaving only relevant distances. Using the product top-view and all relevant distances, product features such as surface of volume can be extracted. Note, that under the assumption that the baking product is symmetric, the relevant distances can be mirrored, for example, or generally speaking assigned to respective symmetric locations.

Figure 7:
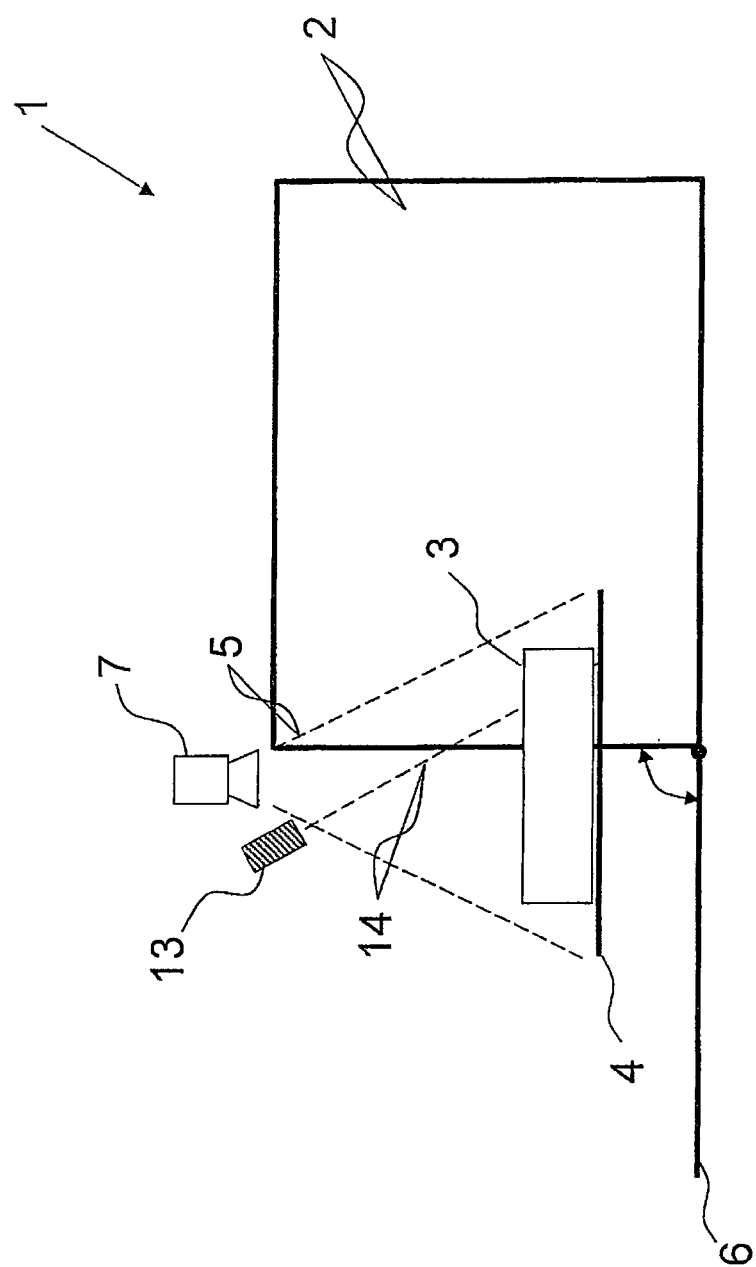
FIG. 7 illustrates a schematic sectional side view of a baking oven in second embodiment.

FIG. 7 illustrates a schematic sectional side view of a baking oven in a second embodiment. The following description is restricted to differences compared to the first embodiment. As far as applicable, all features mentioned in connection with the first embodiment shall apply to the second embodiment as well.

In the second embodiment, a line laser 13 is used instead of the distance sensor. Note, that more than one line laser 13 or a combination of line laser/s 13 and distance sensor/s 8 is also possible, which a skilled person shall be able to implement, based on preceding and following explanations.

The line laser 13 is positioned at the upper side of the chamber opening 5 and preferably inclined by a predefined angle. The camera 7 also is positioned at the upper side of the chamber opening 5, near the line laser 13.

During insertion, the line laser 13 emits a green, fan-shaped laser line 14 while the camera 7 continuously records product top-views 11. Note that the laser line 14 may be of any other suitable color. In the present case, the camera 7 is of color type.

Figure 8:
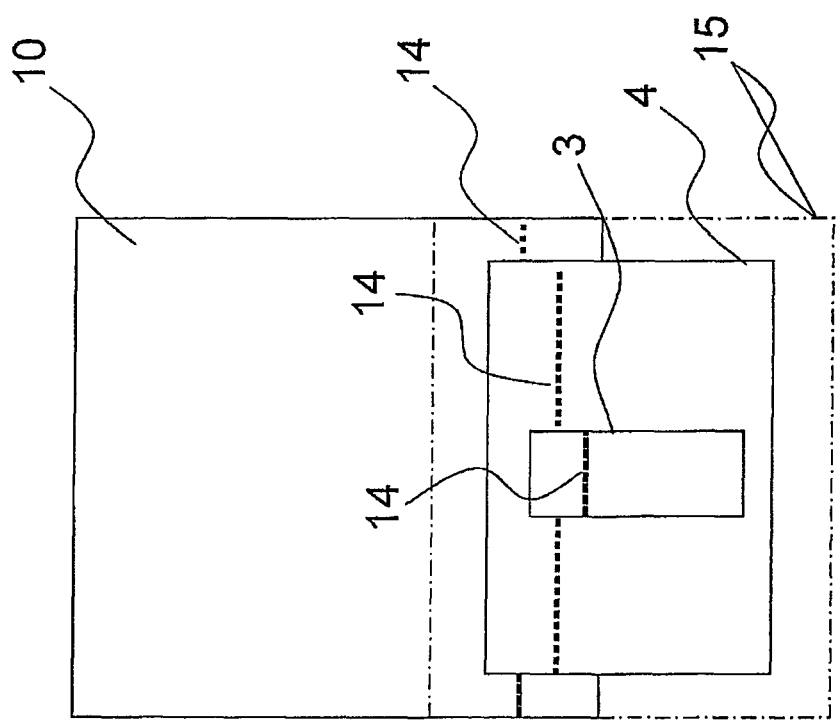
FIG. 8 illustrates a product top-view including high-lighted contour levels.

The laser line 14 strikes the baking product 3 and thereby highlights contour-levels of the baking product 3. This is illustrated in FIG. 8. Note that only for the sake of simplicity of illustration, the baking product 3 is chosen to be of square shape.

FIG. 8 illustrates a product top-view including contour levels highlighted by the laser line 14. The green color of the laser line 14 is distinguishable from most baking products 3 and colors used for trays 4 and inner walls of baking chambers 2. Therefore, laser line projections representative of highlighted contour levels can be extracted in each of the product top-views 11. Due to the inclination of the line laser 13, the laser line projections are staggered in the product top-views. Note that the field of view of the camera 7 at the bottom 10 of the baking chamber 2 is indicated by a broken-dotted line, and denoted by reference number 15.

Figure 9:
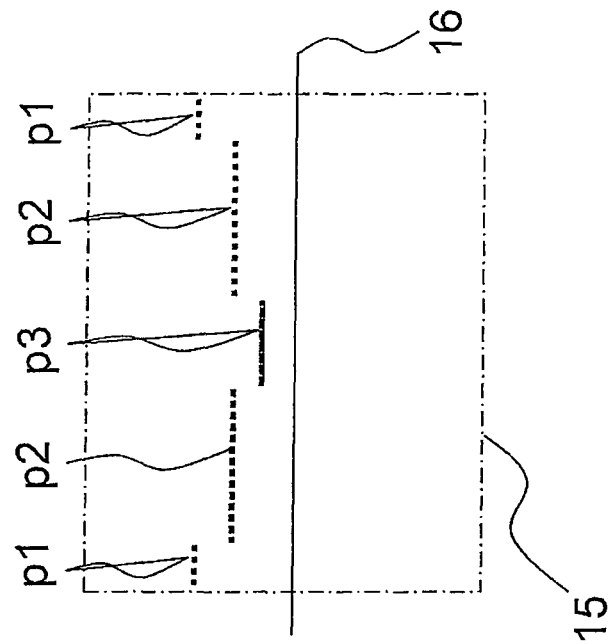
FIG. 9 illustrates laser line projections representative of highlighted contour-levels.

FIG. 9 illustrates the laser line projections of FIG. 8 after extraction from the respective product top-view 11. The original size of the recorded product top-view 11 is indicated by a frame. The laser line projections can be classified as follows: first projections p1 representative contour levels of the bottom 10 of the baking chamber 2, second laser line projections p2 representative of contour levels of the tray 4 and third laser line projections p3 representative of contour levels of the baking product 3.

Based on the laser line projections p1, p2 and p3, the local contour level, i. e. the relative height of a respective location, i. e. bottom 10, tray 4 and baking product 3, can be calculated. Using the inclination angle, the position of the line laser 13 and the distances between respective laser line projections p1 to p3 and center line 16 of the field of view 15, respective contour levels can be extracted by triangulation, for example.

A product top-view containing the whole tray 4 and baking product 3 can be used to register the baking product 3 in order to determine the border 12. Using the pixel resolution of the camera 7, for example, the border 12 can be transformed into x-y-coordinates, which coordinates can be combined with extracted contour levels of the baking product 3, for determining surface and volume, or other product-features.

The advantage of using a line laser 13 according to the second embodiment is, that all types of regular and irregular product shapes and situations in which several equal or different shaped baking products 3 are positioned on the tray 4 can be handled without difficulties.

The use of a linear, 1-dimensional laser line instead of the fan-shaped laser line 14 of the second embodiment corresponds to the situation of the first embodiment, and reference is made to the first embodiment.

As to the second embodiment, advantages related to automation of the baking process apply mutatis mutandis.

Although the invention has been described in connection with a baking oven 1, the invention can be applied to other types of ovens, wherein all the advantages and advantageous effects can be achieved as well.

From the discussion above, it becomes clear that the object of the invention is achieved by an oven and a method as set out in the claims.

LIST OF REFERENCE SIGNS 1 baking oven
2 baking chamber
3 baking product
4 tray
5 chamber opening
6 door
7 digital camera
8 distance sensor
9 infrared or ultrasound wave
10 bottom
11 product top-view
12 border
13 line laser
14 laser line
15 field of view 16 center line
d distance
d1, d2, d3 first to third distances
n number
p1, p2, p3 first to third laser line projections

The invention claimed is:

1. Method of operating an oven (1) for heating a food product (3) comprising the steps of
   extracting a product-feature of a product (3) intended to be heated in a chamber (2) of the oven (1), by
   recording at least one product top-view (11) via at least one camera (7);
   at least one of extracting or highlighting, in the course of inserting the product (3) into the chamber, contour-levels of at least a section of the product (3) and, an object (4) intended for insertion along with the product (3) into the chamber (2), by using at least one contour-level unit; and
   extracting the at least one product-feature on the basis of the top-views (11) and contour-levels and
   based on the at least one product-feature automatically controlling or conducting heating of the product (3).

2. Method according to claim 1, wherein at least a section of the product (3) is registered within a two-dimensional product top-view (11), and wherein the extraction of at least one product-feature is further based on registered product data.

3. Method according to claim 1, wherein the step of extracting contour-levels comprises measuring distances (d, d1, d2, d3) between at least one distance sensor (8) and upper surface levels of the product (3) and the object (4), respectively, by means of the at least one distance sensor (8).

4. Method according to claim 1, wherein the step of highlighting contour-levels comprises highlighting a contour of the product (3) and object (4), respectively, by respectively projecting at least one beam of light onto the product (3) and object (4), respectively.

5. Method according to claim 1, further comprising the step of using the contour-levels to generate approximated further contour-levels for enhanced product-feature extraction.

6. Method according to claim 1, wherein the object is a tray (4) for placing the product (3) thereon, and wherein a tray-level is automatically determined on the basis of tray contour-levels.

7. Method according to claim 1, wherein the product-feature is selected from the group consisting of: vertical cross section, horizontal cross section, shape, surface, surface area, volume, dimension, center-of-gravity of the product (3) and center-of-gravity to surface distance.

8. The method of claim 1, wherein the heating of the product (3) is further automatically controlled or conducted based on secondary data representative of a physical configuration of the product (3), said secondary data including at least one of product temperature, product weight and product density.

9. The method of claim 2, wherein the registered product data includes at least one of edges, borders (12) and circumferential lines of the product (3).

10. The method of claim 3, wherein the distance sensor is located at an opening of the chamber for inserting the product into the chamber.

11. The method of claim 4, wherein the at least one beam of light comprises a laser line (14) projected onto the product at a predefined angle.

12. The method of claim 5, wherein the further contour-levels are approximated using at least one of extrapolation and interpolation.

* * * * *